United States Patent
Guo et al.

(10) Patent No.: US 11,865,724 B2
(45) Date of Patent: Jan. 9, 2024

(54) MOVEMENT CONTROL METHOD, MOBILE MACHINE AND NON-TRANSITORY COMPUTER READABLE STORAGE MEDIUM

(71) Applicant: UBKang (Qingdao) Technology Co., Ltd., Qingdao (CN)

(72) Inventors: Dejun Guo, San Gabriel, CA (US); Huan Tan, Pasadena, CA (US)

(73) Assignee: UBKANG (QINGDAO) TECHNOLOGY CO., LTD., Shenzhen (CN)

( * ) Notice: Subject to any disclaimer, the term of this patent is extended or adjusted under 35 U.S.C. 154(b) by 246 days.

(21) Appl. No.: 17/239,691

(22) Filed: Apr. 26, 2021

(65) Prior Publication Data

US 2022/0339786 A1  Oct. 27, 2022

(51) Int. Cl.
*B25J 9/16* (2006.01)
*B25J 19/02* (2006.01)
(Continued)

(52) U.S. Cl.
CPC ........... *B25J 9/1664* (2013.01); *B25J 19/023* (2013.01); *G06F 17/11* (2013.01); *G06T 3/20* (2013.01); *G06T 7/50* (2017.01); *G06T 7/74* (2017.01)

(58) Field of Classification Search
CPC ....... B25J 9/1664; B25J 19/023; G06F 17/11; G06T 3/20; G06T 7/50; G06T 7/74;
(Continued)

(56) References Cited

U.S. PATENT DOCUMENTS

2020/0327695 A1* 10/2020 Lin ................. G06V 20/20

FOREIGN PATENT DOCUMENTS

CN  108628310 A  10/2018

OTHER PUBLICATIONS

K. Deguchi, "Optimal motion control for image-based visual servoing by decoupling translation and rotation," Proceedings. 1998 IEEE/RSJ International Conference on Intelligent Robots and Systems. (Cat. No. 98CH36190), Victoria, BC, Canada, 1998, pp. 705-707 (Year: 1998).*

(Continued)

*Primary Examiner* — Abby Y Lin
*Assistant Examiner* — Dylan Brandon Mooney

(57) ABSTRACT

Image-based trajectory planning for a mobile machine having a camera is disclosed. A trajectory for the mobile machine to move to a referenced target is planned by obtaining, a desired image of the referenced target captured at a desired pose of the trajectory and an initial image of the referenced target captured at an initial pose of the trajectory through the camera of the mobile machine, calculating a homography of the desired image and the initial image; decomposing the homography into an initial translation component and an initial rotation matrix, obtaining optimized translation component(s) corresponding to constraint(s) for the mobile machine based on the initial translation component, obtaining optimized homography(s) based on the optimized translation component(s) and the initial rotation matrix, and obtaining objective image features corresponding to the trajectory based on the optimized homography(s).

19 Claims, 11 Drawing Sheets

(51) Int. Cl.
*G06F 17/11* (2006.01)
*G06T 7/50* (2017.01)
*G06T 7/73* (2017.01)
*G06T 3/20* (2006.01)

(58) Field of Classification Search
CPC .......... G06T 7/248; G06T 2207/30241; G06T 2207/30252; G01C 21/206
See application file for complete search history.

(56) References Cited

OTHER PUBLICATIONS

Jian Chen, W. E. Dixon, M. Dawson and M. McIntyre, "Homography-based visual servo tracking control of a wheeled mobile robot," in IEEE Transactions on Robotics, vol. 22, No. 2, pp. 406-415, Apr. 2006, doi: 10.1109/TRO.2006.862476. (Year: 2006).*
Borgstadt, J.A., & Ferrier, N.J. (2001). Visual servoing: Path interpolation by homography decomposition. In 2001IEEE International Conference on Robotics and Automation (ICRA), May 21-26, 2001, 1, 723-730. doi: 10.1109/ROBOT.2001.932636 (Year: 2001).*
K. Zhang, J. Chen, Y. Li and Y. Gao, "Unified Visual Servoing Tracking and Regulation of Wheeled Mobile Robots With an Uncalibrated Camera," in IEEE/ASME Transactions on Mechatronics, vol. 23, No. 4, pp. 1728-1739, Aug. 2018, doi: 10.1109/TMECH.2018.2836394. (Year: 2018).*
ISR for PCT/CN2021/139492.
Written opinions of ISA for PCT/CN2021/139492.

* cited by examiner

MOVEMENT CONTROL METHOD, MOBILE MACHINE AND NON-TRANSITORY COMPUTER READABLE STORAGE MEDIUM

BACKGROUND

1. Technical Field

The present disclosure relates to trajectory planning, and particularly to an image-based trajectory planning method and a movement control method as well as a mobile machine using the same.

2. Description of Related Art

With the help of the maturity of artificial intelligence (AI) techniques, mobile machines such as mobile robots and vehicles have been used in various scenes of daily life to provide various services such as housework, healthcare, and transportation. To provide the services in a more mobile way, automatic navigation capability is needed. Trajectory planning is one of the essential technologies to realize automatic navigation, which provides trajectories for a mobile machine to move to the destination while considering kinematic constraint, path length, obstacle avoidance, and the like.

The most common trajectory planning techniques are realized in the Cartesian coordinate (which as x, y and z axis), which is straightforward and has been widely used already, while not all states of the mobile machine in the Cartesian coordinate can be measured directly or accurately when, for example, the poses of the mobile machine are to be measured while the measurement can only be realized through a single onboard camera. One solution called "image-based" technique is to use the image features of images captured by the camera which are expressed in the image plane coordinate. The image features can be calculated from multiple feature points fixed in the environment and treated as the states of the mobile machine in the image plane coordinate.

As a newly developed technique, the existing image-based trajectory planning in image plane coordinate still focuses on full-actuated manipulators and three-dimensional (3D) drones (which is holonomic), and the planned trajectory may be not reachable and practical for the mobile machines with nonholonomic and underactuated constraints.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
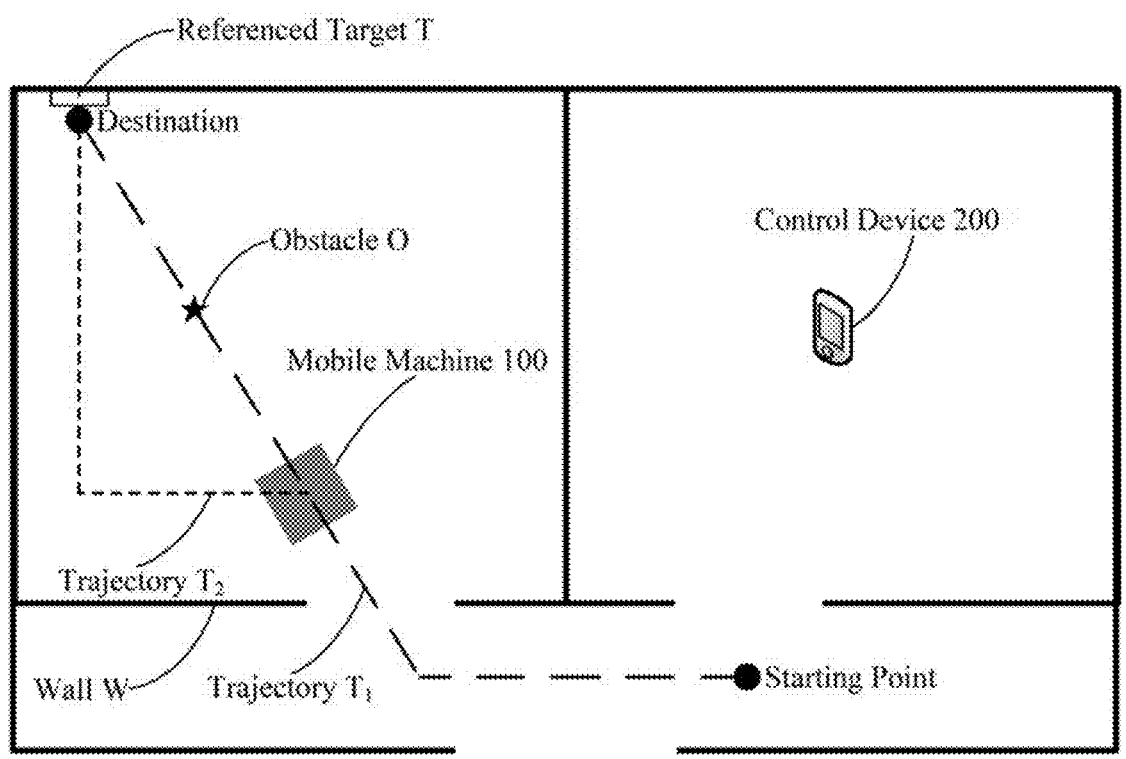
FIG. 1A is a schematic diagram of a scenario of navigating a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising". "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to trajectory planning and movement control for a mobile machine. As used herein, the term "mobile machine" refers to a machine such as a vehicle or a mobile robot that has the capability to move around in its environment. The term "trajectory planning" refers to find a sequence of valid configurations that moves a mobile machine from the source to the destination and is parametrized by time, where "trajectory" denotes a sequence of poses with time stamp (cf. "path" denotes a sequence of poses or position without time stamp). The term "pose" refers to position (e.g., x and y coordinates on x and y axes) and posture (e.g., a yaw angle along z axis). The term "nonholonomic constraint" refers to constraint for the movement manners of a mobile machine, for example, can move straightly and rotate while cannot move left and right directly). The term "navigation" refers to the process of monitoring and controlling the movement of a mobile machine from one place to another, and the term "collision avoidance" refers to prevent or reduce the severity of a collision. The term "sensor" refers to a device, module, machine, or subsystem such as ambient light sensor and image sensor (e.g., camera) whose purpose is to detect events or changes in its environment and send the information to other electronics (e.g., processor).

FIG. 1A is a schematic diagram of a scenario of navigating a mobile machine 100 according to some embodiments of the present disclosure. The mobile machine 100 (e.g., a sweeping robot) is navigated in its environment (e.g., an office) to, for example, performing a parking task such as auto charging, parking for pick up, parking for interaction to user, and parking for waypoints cruising, while dangerous situations such as collisions and unsafe conditions (e.g., falling, extreme temperature, radiation, and exposure) may be prevented. In this indoor navigation, the mobile machine 100 is navigated from a starting point (e.g., the location where the mobile machine 100 originally locates) to a destination (e.g., the location of the goal of navigation which is indicated by the user or the navigation/operation system of the mobile machine 100), while the wall W and the obstacle O (e.g., furniture, human, pet, and garbage) may be avoided so as to prevent the above-mentioned dangerous situations. The trajectory(s) (e.g., trajectory $T_1$ and trajectory $T_2$) for the mobile machine 100 to move from the starting point to the destination has to be planned so as to move the mobile machine 100 according to the trajectory(s). It should be noted that, the starting point and the destination only represent the locations of the mobile machine 100 in the scenario shown in the figure, rather than the real beginning and end of the trajectory(s) (the real beginning and end of a trajectory should be a pose, respectively. e.g., initial pose $S_i$ and desired pose $S_d$ in FIG. 1B and FIG. 3B). In some embodiments, for realizing the navigation and/or the trajectory planning of the mobile machine 100, the map for the environment has to be built, and the position of the mobile machine 100 in the environment may have to be determined. For example, a trajectory $T_1$ may be planned based on the built map (and the determined position of the mobile machine 100).

Figure 1B:
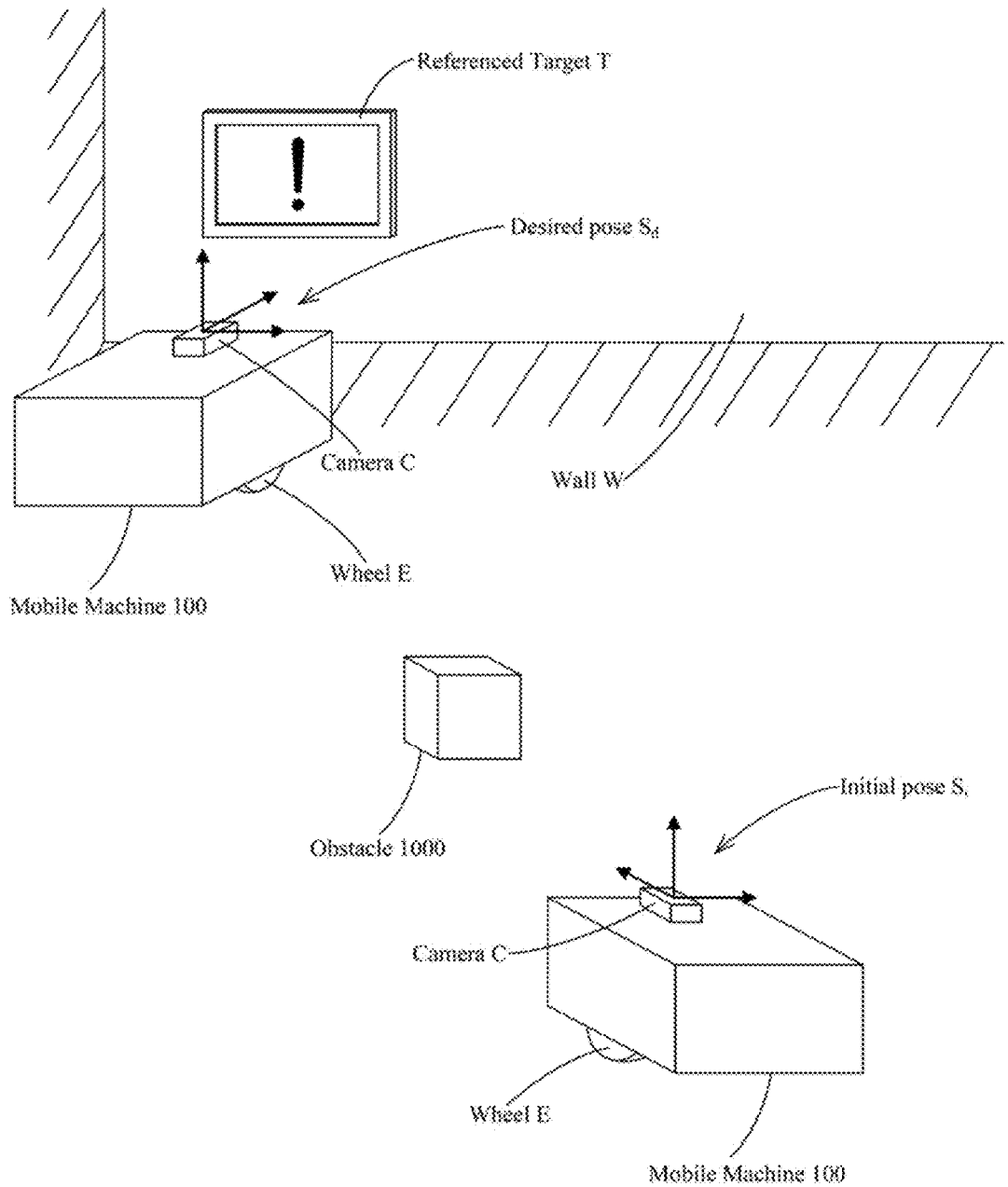
FIG. 1B is a schematic diagram of navigating a mobile machine from an initial pose to a desired pose relative to a referenced target in the scenario of FIG. 1A.

FIG. 1B is a schematic diagram of navigating the mobile machine 100 from an initial pose $S_i$ to a desired pose $S_d$ relative to a referenced target T in the scenario of FIG. 1A. The initial pose $S_i$ is the beginning of a trajectory $T_2$, and the desired pose $S_d$ is the end of the trajectory $T_2$. In addition to the trajectory $T_1$ planned based on the built map, another trajectory $T_2$ may be planned (or the trajectory $T_1$ may be replanned) in response to, for example, having detected the referenced target T through a camera C of the mobile machine 100, and the collision avoidance to the obstacle O may also considered when planning, so as to accurately navigate the mobile machine 100 according to the detected referenced target T. The referenced target T may be taken as a reference for moving the mobile machine 10 so as to determine whether the mobile machine 100 has reached the destination or not. The camera C may be a calibrated forward-facing camera which has a camera coordinate system F (see FIG. 6B), and the coordinates of the mobile machine 100 are consistent with the coordinates of the camera C.

In some embodiments, the navigation and/or the trajectory planning of the mobile machine 100 may be actuated through the mobile machine 100 itself (e.g., a control interface on the mobile machine 100) or a control device 200 such as a remote control, a smart phone, a tablet computer, a notebook computer, a desktop computer, or other electronic device by, for example, providing a request for the navigation and/or the trajectory planning of the mobile machine 100. The mobile machine 100 and the control device 200 may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks.

Figure 2:
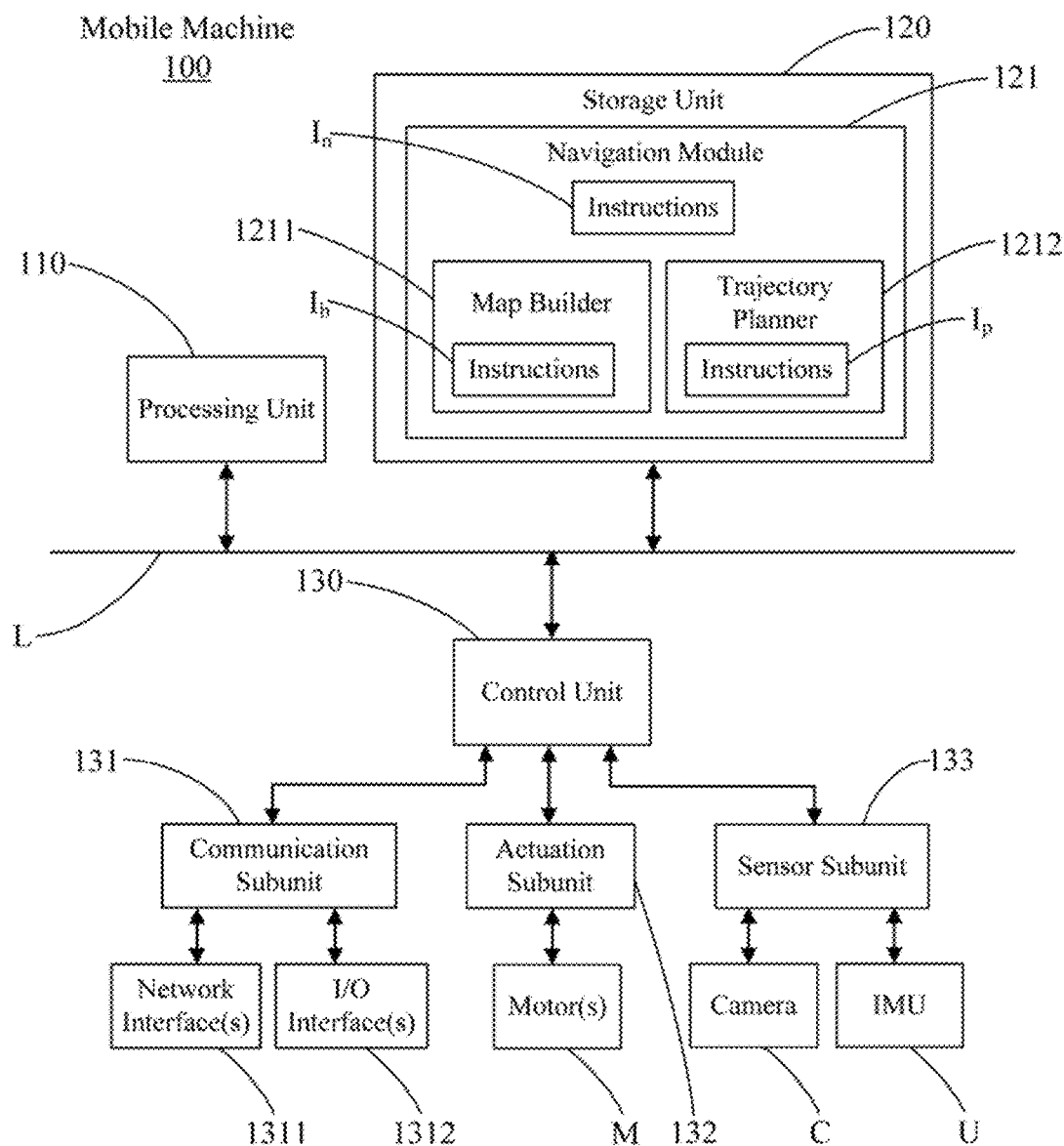
FIG. 2 is a schematic block diagram illustrating a mobile machine according to some embodiments of the present disclosure.

FIG. 2 is a schematic block diagram illustrating the mobile machine 100 according to some embodiments of the present disclosure. The mobile machine 100 may be a mobile robot such as a wheeled robot, which may include a processing unit 110, a storage unit 120, and a control unit 130 that communicate over one or more communication buses or signal lines L. It should be noted that, the mobile machine 100 is only one example of mobile machine, and the mobile machine 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobile machine 100, which may be stored in the one or more memories (and the one or more non-transitory computer readable storage mediums). In other embodiments, the mobile machine 100 may be a vehicle such as a car, a drone, or a vessel.

The navigation module 121 in the storage unit 120 of the mobile machine 100 may be a software module (of the operation system of the mobile machine 100), which has instructions $I_n$ (e.g., instruction for actuating motor(s) M of the mobile machine 100 to move the mobile machine 100) for implementing the navigation of the mobile machine 100, a map builder 1211, and trajectory planner(s) 1212. The map builder 1211 may be a software module having instructions $I_b$ for building map for the mobile machine 100. The trajectory planner(s) 1212 may be software module(s) having instructions $I_p$ for planning path for the mobile machine 100. The trajectory planner(s) 1212 may include a global trajectory planner for planning global trajectories (e.g., trajectory $T_1$) for the mobile machine 100 and a local trajectory planner for planning local trajectories (e.g., trajectory $T_2$) for the mobile machine 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory $P_g$, and other data collected by the mobile machine 100. For example, images may be collected through the camera C of the mobile machine 100, and the collected images may be analyzed so as to identify obstacles, so that the local trajectory can be planned with reference to the identified obstacles, and the obstacles can be avoided by moving the mobile machine 100 according to the planned local trajectory.

Each of the map builder 1211 and the trajectory planner(s) 1212 may be a submodule separated from the instructions $I_n$ or other submodules of the navigation module 121, or a part of the instructions $I_n$ for implementing the navigation of the mobile machine 100. The trajectory planner(s) 1212 may further have data (e.g., input/output data and temporary data) related to the trajectory planning of the mobile machine 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobile machine 100 (e.g., obstacle detection and path replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device 200 via the network(s) N and I/O interface(s) 1312 (e.g., a physical button), and the like. The actuation subunit 132 is coupled to component(s)/device(s) for implementing the motions of the mobile machine 100 by, for example, actuating motor(s) M of wheels E (see FIG. 1B) and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

The mobile machine 100 may further include a sensor subunit 133 which may include a set of sensor(s) and related controller(s), for example, the camera C and an IMU U (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

In some embodiments, the map builder 1211, the trajectory planner(s) 1212, the sensor subunit 133, and the motor(s) M (and wheels and/or joints of the mobile machine 100 coupled to the motor(s) M) jointly compose a (navigation) system which implements map building, (global and local) trajectory planning, and motor actuating so as to realize the navigation of the mobile machine 100. In addition, the various components shown in FIG. 2 may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 3A:
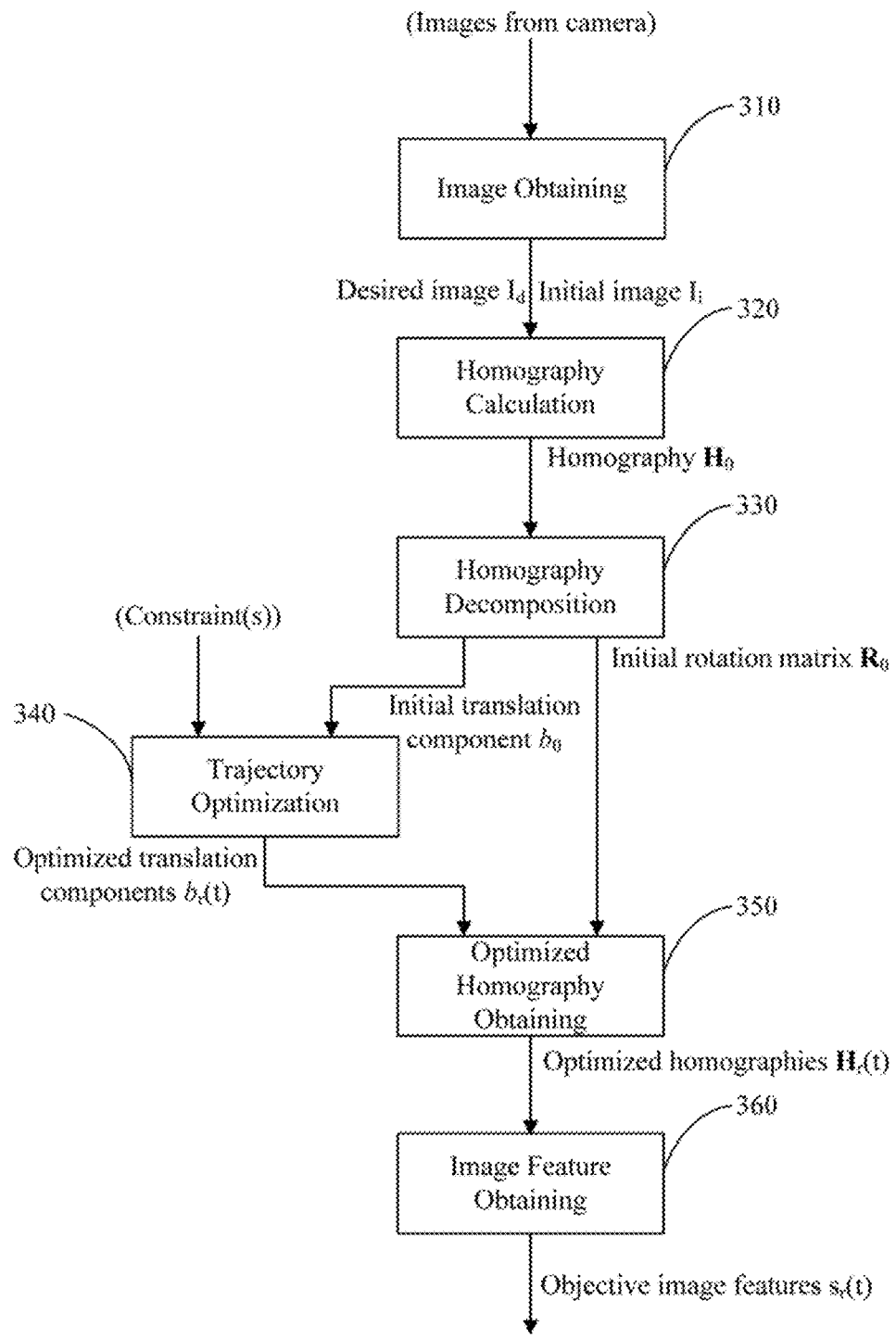
FIG. 3A is a schematic block diagram of an example of trajectory planning for the mobile machine of FIG. 2.

FIG. 3A is a schematic block diagram of an example of trajectory planning for the mobile machine 100 of FIG. 2. In some embodiments, an image-based trajectory planning method for the mobile machine 100 is implemented in the mobile machine 100 to plan a trajectory (e.g., the trajectory $T_2$) for the mobile machine 100 in terms of image features in image plane coordinate by, for example, storing (sets of) instructions $I_c$ corresponding to the trajectory planning method as the trajectory planner(s) 1212 in the storage unit 120 and executing the stored instructions $I_c$ through the processing unit 110, and then the mobile machine 100 may be navigated according to the planned trajectory. The trajectory planning method may be performed in response to, for example, having detected the referenced target T through the camera C of the mobile machine 100, and may simultaneously considering the obstacles (e.g., the obstacle O) detected through the camera C of the mobile machine 100, then it may also be re-performed in response to, for example, having detected unexpected obstacles. In other embodiments, the trajectory planning method may also be performed in response to a request for the navigation and/or the trajectory planning of the mobile machine 100 from, for example, (the navigation/operation system of) the mobile machine 100 itself or the control device 200.

Figure 3B:
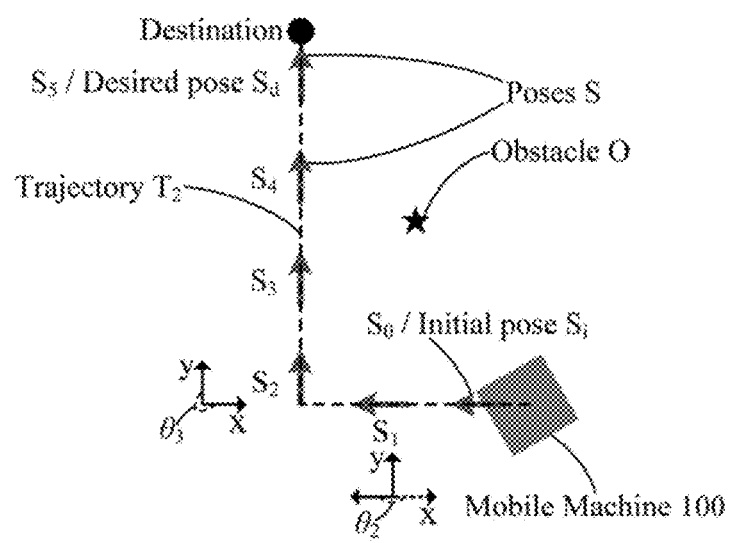
FIG. 3B is a schematic diagram of a trajectory in the scenario of FIG. 1A which is planned through the example of trajectory planning of FIG. 3A.

FIG. 3B is a schematic diagram of the trajectory $T_2$ in the scenario of FIG. 1A which is planned through the example of trajectory planning of FIG. 3A. The planned trajectory $T_2$ includes a plurality of consecutive poses S (i.e., pose $S_0$-pose $S_5$) for the mobile machine 100. Each of the poses S includes a time stamp. It should be note that, the poses S shown in the figure only an example, and the planned trajectory $T_2$ may actually have more or less poses S. In addition, the distance between the poses S can be determined according to actual needs. For example, for centimeter level accuracy, the distance may be smaller than 5 cm, 10 cm, or the like. Each of the poses S includes a position (e.g., coordinates in the world coordinate system) and a posture (e.g., an Euler angle in the world coordinate system) for the mobile machine 100. The motor(s) M of the mobile machine 100 may be actuated according to the poses S in the trajectory $T_2$ so that the mobile machine 100 is moved according to the trajectory $T_2$, thereby implementing the navigation of the mobile machine 100. In some embodiments, the trajectory $T_2$ may be planned through the above-mentioned local trajectory planner by generating the trajectory $T_2$ while taking the identified obstacles (e.g., the obstacle O) into consideration (e.g., avoiding the identified obstacles).

According to the trajectory planning method, the processing unit 110 obtains a desired image $I_d$ of the referenced target T and an initial image $I_i$ of the referenced target T through the camera C of the mobile machine 100 (block 310 of FIG. 3A). The desired image $I_d$ of the referenced target T is captured at the desired pose $S_d$ (see FIG. 1B and FIG. 3B) of the trajectory $T_2$, and the initial image $I_i$ of the referenced target T is captured at the initial pose $S_i$ (see FIG. 1B and FIG. 3B) of the trajectory $T_2$. The initial pose $S_i$ is the first of the plurality of poses S in the trajectory $T_2$, and the desired pose $S_d$ is the last of the plurality of poses S. The desired image $I_d$ and the initial image $I_i$ both include the referenced target T, so that the referenced target T can be recognized by the mobile machine 100 and feature points (e.g., feature points $P_0$-$P_3$ in FIG. 3C) in each image that correspond to the referenced target T can be obtained. The desired image $I_d$ and the initial image $I_i$ may be captured in advance before performing the trajectory planning method. For example, the desired image $I_d$ may be first captured (e.g., at the destination of the trajectory $T_2$) through (the camera C of) the mobile machine 100, or through other device isolated from the mobile machine 100 and then transmitted to the mobile machine 100, then the initial image $I_i$ may be captured (e.g., at the current position of the mobile machine 100) through (the camera C of) the mobile machine 100.

Figure 3C:
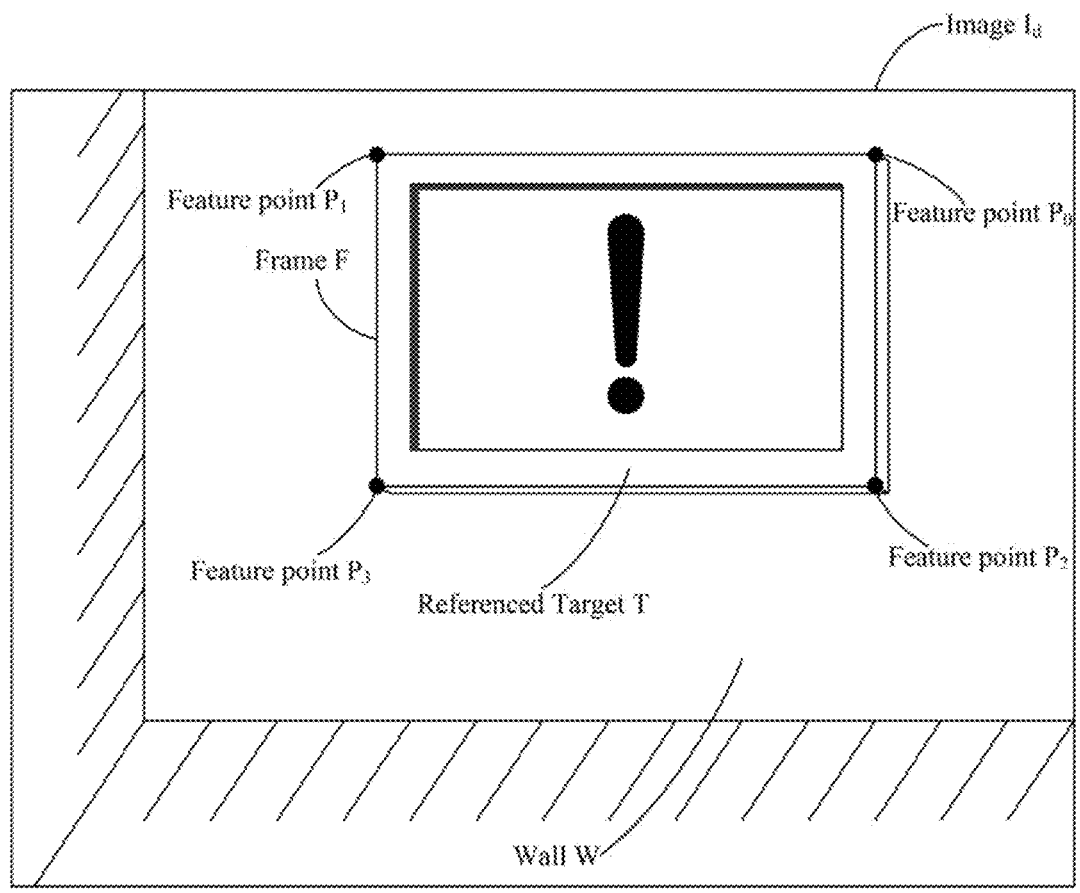
FIG. 3C is a schematic diagram of a desired image captured by a camera of the mobile machine of FIG. 2.

FIG. 3C is a schematic diagram of the desired image $I_d$ captured by the camera C of the mobile machine 100 of FIG. 2. The desired image $I_d$ is captured when the mobile machine 100 is at the desired pose $S_d$. In some embodiments, the referenced target T included in the desired image $I_d$ (and the initial image $I_i$) may be an object such as a sign that has rich visual feature in the environment where the mobile machine 100 is located, so as to be easily recognized and the feature points in the image that correspond to the referenced target T can be easily obtained. The feature point may be a point (i.e., pixel) in the image that has the feature (e.g., color) different from its surrounding points, for example, the four corner points at the corner of the referenced target T in the image that can be differentiated from the wall W can be taken as the feature points. The feature points may be detected using SIFT (scale-invariant feature transform) algorithm. In other embodiments, the referenced target T may be other object, for example, a mark on the wall W or a docking station for the mobile machine 100.

The processing unit 110 may further calculate a homography $H_0$ of the desired image $I_d$ and the initial image $I_i$ (block 320 of FIG. 3A). In one embodiment, for any two images, there is one homography (essential matrix) may be calculated as follows:

$$[y_1(t), \ldots, y_n(t)] \propto H(t)[y_1(t_f), \ldots, y_n(t_f)];$$

where, H(t) is the Euclidean homography of the two images, $t \in [0, t_f]$, 0 is the starting time corresponding to the initial image $I_i$, and $t_f$ is the ending time (which is with respect to the starting time, in seconds) corresponding to the desired image $I_d$ (the sequence of H(0)-H($t_f$) can be seen as the trajectory of homography); $y_i(t)$ is the i-th image point on the image plane coordinate (unit in pixel) of an image which is captured at the time t (the image will be the initial image $I_i$ when t=0, and will be the desired image $I_d$ when t=$t_f$), and there are n points in the initial image $I_i$ which are matched with n points in the desired image $I_d$ (n is larger than or equal to three); and $y_i(t_f)$ is the i-th image point on the image plane coordinate (unit in pixel) of the desired image $I_d$ which is captured at the ending time $t_f$, there are also n points in the desired image $I_d$ which are matched with the n points in the initial image $I_i$. $\propto$ means the left-hand side is proportional to the right-hand side but they may not be equal. That is, the homography H(t) can be solved up to a scale rather than obtain its truth value. Having given those 2n points in the initial image $I_i$ and the desired image $I_d$, the homography H(t) can be solved. For example, if there are 4 pairs of coplanar points (i.e., n=4) can be detected and matched in in the initial image $I_i$ and the desired image $I_d$ (here points are assumed in a plane Π (not shown)), the homography H(t) can be solved through a corresponding equation set containing 8 equations. Since the homography H(t) has 9 entries (3×3), the solution of equation set is linear dependent of the truth value as mentioned above. $H_0$ is the homography corresponding to the initial image $I_i$ (captured at the starting time of 0) and the desired image $I_d$, that is, the homography H(0).

The processing unit 110 may further decompose the homography $H_0$ into an initial translation component $b_0$ and an initial rotation matrix $R_0$ (block 330 of FIG. 3A). The initial translation component $b_0$ is a translation between the desired image $I_d$ and the initial image $I_i$ in the (three-dimensional) camera coordinate system F, and the initial translation component $b_0$ is a rotation between the desired image $I_d$ and the initial image $I_i$ in the camera coordinate system F. By decomposing the homography $H_0$, the initial translation component $b_0$ and the initial rotation matrix $R_0$ between the two image up to a scale can be obtained, and a true scale can be obtained by measuring the depth information when recording the desired image $I_d$. In some embodiments, the homography H(t) may be decomposed into a rotation matrix R(t) and a translation component b(t) through an equation of:

$$H(t) = R(t) + \frac{b(t)}{d_f}\alpha_f;$$

where, the rotation matrix R(t) represents a rotation between the two images corresponding to the homography H(t) in the camera coordinate system F, the translation component b(t) represents a translation between the two images corresponding to the homography H(t) in the camera coordinate system F, $d_f$ is the depth from the origin of the desired image $I_d$ to the plane Π, and $\alpha_f$ is the unitary normal to the plane Π in the desired image $I_d$. If $d_f$ is known ahead, the truth value of the homography H(t) can be calculated, and the truth value of the rotation matrix R(t) and the translation component b(t) can be obtained too. As mentioned above, the homography H(t) is given, hence the rotation matrix R(t) and the translation component b(t) can be obtained in an analytical form. As mentioned above, $H_0$ is the homography H(0), hence the initial translation component $b_0$ is b(0), that is, the translation component corresponding to the initial image $I_i$ (captured at the starting time of 0) and the desired image $I_d$, and the initial rotation matrix $R_0$ is R(0), that is, the rotation matrix corresponding to the initial image $I_i$ and the desired image $I_d$.

Figure 4:
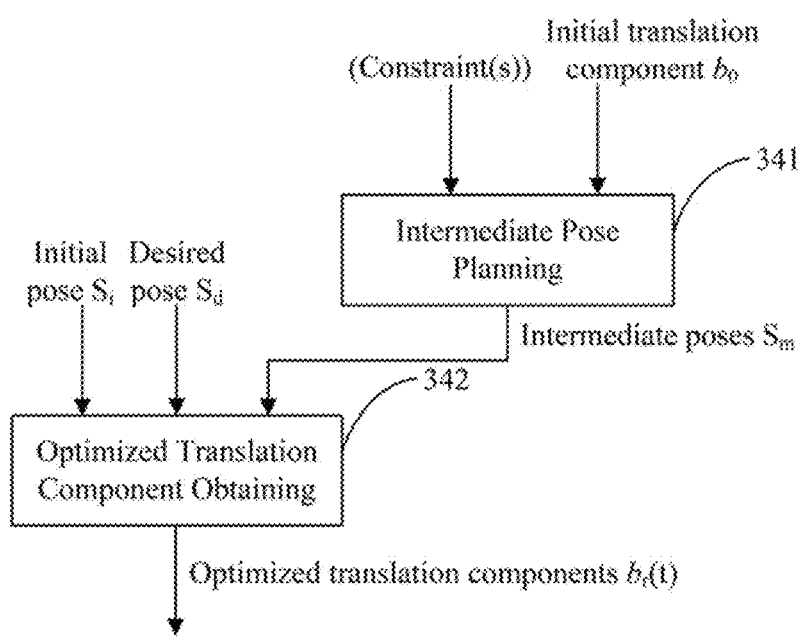
FIG. 4 is a schematic block diagram of an example of trajectory optimization in the example of trajectory planning of FIG. 3A.

The processing unit 110 may further obtain optimized translation components $b_r(t)$ corresponding to constraint(s) for the mobile machine 10 based on the initial translation component $b_0$ (block 340 of FIG. 3A). The optimized translation components $b_r(t)$, that is, a smooth trajectory of translation components which meets the constraint(s) for the mobile machine 100 is to be obtained. The constraint(s) may be, for example, nonholonomic constraint of the mobile machine 100 (e.g., the mobile machine 100 can only move straightly and rotate), kinematic constraint (e.g., the maximum allowed velocity of the mobile machine 100), shortest trajectory, and/or other constraint of the mobile machine 100 itself or the environment where it is located. FIG. 4 is a schematic block diagram of an example of trajectory optimization in the example of trajectory planning of FIG. 3A. In some embodiments, for optimizing against the constraints for the mobile machine 10 (block 340 of FIG. 3A) in the trajectory planning method, the processing unit 110 may plan intermediate pose(s) $S_m$ of the trajectory $T_2$ that meet the constraint(s) for the mobile machine 100 based on the initial translation component $b_0$ (block 341). The intermediate pose(s) $S_m$ (i.e., poses $S_1$-$S_4$ in FIG. 3B) are between the initial pose $S_i$ (i.e., pose $S_0$ in FIG. 3B) and the desired pose $S_d$ (i.e., pose $S_5$ in FIG. 3B) in the trajectory $T_2$, which may include a sequence of continuous poses each having x and y coordinates and a yaw angle (e.g., angle $\theta_2$ and angle $\theta_3$ in FIG. 3B). The initial pose $S_i$, intermediate pose(s) $S_m$, and the desired pose $S_d$ jointly form the consecutive poses S of the trajectory $T_2$ (see FIG. 3B).

In some embodiments, each constraint for the mobile machine 100 may be represented through one objective function of translation component b, and the sequence of intermediate pose(s) $S_m$ may be planned (in the camera coordinate system F) based on the objective function(s) by, for example, the above-mentioned local trajectory planner using TEB algorithm. In the case that TEB algorithm is used, the optimization problem will be transformed into a hyper-graph. The poses S of the mobile machine 100 and the time interval therebetween are used as nodes of the hyper-graph, and objective functions are used as edges of the hyper-graph. Each node is connected by edge(s) to form the hyper-graph, and the hyper-graph is optimized to solve the optimization problem accordingly.

Trajectory Optimization: With Nonholonomic Constraint

Figure 5:
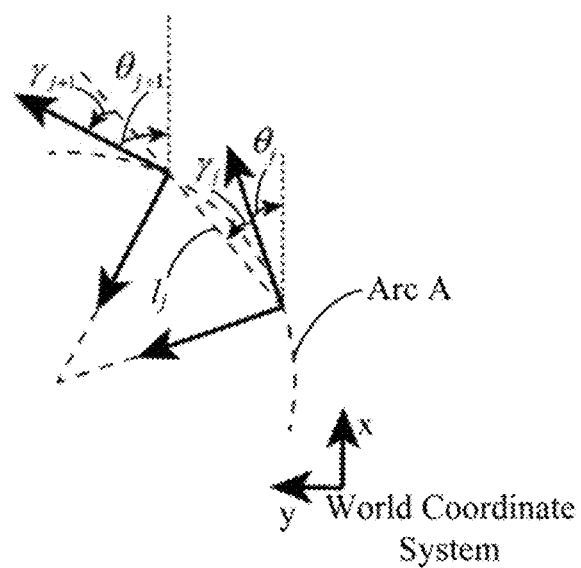
FIG. 5 is a schematic diagram of applying nonholonomic constraints in the example of trajectory optimization of FIG. 4.

FIG. 5 is a schematic diagram of applying nonholonomic constraints in the example of trajectory optimization of FIG. 4. In the case that the mobile machine 100 has the nonholonomic constraint which the mobile machine 100 cannot directly move left and right but can only move straightly (forwards and backwards) and rotate, the mobile machine 100 can only move along current heading direction, and it is approximated that between every two consecutive poses, the mobile machine 100 moves along an arc A of a circle, and $\gamma_j = \gamma_{j+1}$. Through cross product, there are:

$$\gamma_j = x_j \times l_j; \text{ and}$$

$$\gamma_{j+1} = l_j \times x_{j+1};$$

where, $x_j = [\cos \theta_j, \sin \theta_j, 0]^T$ and $x_{j+1} = [\cos \theta_{j+1}, \sin \theta_{j+1}, 0]^T$ represent the heading directions in the world coordinate system, and $l_j$ is the unit vector from the origin of the $x_j$ coordinate to the origin of the $x_{j+1}$ coordinate. The objective function to penalize the nonholonomic constraint is $f_1(b) = \|(x_j + x_{j+1}) \times l_j\|^2$.

Trajectory Optimization: With Kinematic Constraint

If the mobile machine 100 has the kinematic constraint of maximum velocity, for every two consecutive poses, the linear velocity $v_j$ and the angular velocity $\omega_j$ can be approximated by:

$$v_j \simeq \frac{1}{dt_j}\|l_j\|; \text{ and}$$

$$\omega_j \simeq \frac{1}{dt_j}(\theta_{j+1} - \theta_j);$$

where, $dt_j$ is the time interval between the two consecutive poses. The objective function to penalize velocity which is over the maximum value $\bar{v}$ is:

$$f_2(b) = \sum_j (g_j(v_j) + g_j(\omega_j))^2;$$

where, $g_j(x)$ is a smooth function, and $$g_j(x) = \begin{cases} 0 & \text{if } x < \bar{v} - \zeta \\ (x - \bar{v} + \zeta)^2 & \text{else} \end{cases}.$$

Trajectory Optimization: With Fastest Trajectory Constraint

As to the constraint of fastest trajectory for the mobile machine 100, for every two consecutive poses, the objective function for the fastest trajectory constraint is:

$$f_3(b) = \left(\sum_j dt_j\right)^2;$$

where, $dt_j$ is the time interval between the two consecutive poses.

The processing unit 110 may further obtain the optimized translation components $b_r(t)$ based on the initial pose $S_i$, the planned intermediate pose(s) $S_m$, and the desired pose $S_d$ of the trajectory $T_2$ (block 342 of FIG. 4). In some embodiments, the optimized translation components $b_r(t)$ may be obtained through weighted multi-objective optimization an equation of:

$$\min \sum_k \beta_k f_k(b);$$

where, $f_k(b)$ is an objective function corresponding to a constraint of the mobile machine 100 (each objective function corresponds to each constraint) and $\beta_k$ is its weight, $k \in [1, m]$ (m is the number of the constraints of the mobile machine 100), and b is the translation component. Upon minimizing the sum of all the objective functions $f_k(b)$ of all the constraints of the mobile machine 100, the translation component b corresponding to each of the objective functions $f_k(b)$ is taken as an optimized translation component $b_r(t)$ at time t. A sequence of the optimized translation components $b_r(t)$ at the time in-between the starting time 0 and the ending time $t_f$ are obtained. The objective function $f_k(b)$ may be solved through Quasi-Newton method to obtain the optimal solution of the translation component b.

In other embodiments, the optimization against the constraints for the mobile machine 10 (block 340 of FIG. 3A) may also be omitted by, for example, using the translation component b(t) obtained by decomposing the homography H(t) as the optimized translation components b(t).

The processing unit 110 may further obtain optimized homography(s) $H_r(t)$ based on the optimized translation component(s) $b_r(t)$ and the initial rotation matrix $R_0$ (block 350 of FIG. 3A). In some embodiments, the optimized homography(s) $H_r(t)$ may be calculated through an equation of:

$$H_r(t) = R_0 e^{[\varphi_0]t/t_f} + \frac{b_r(t)}{d_f} \alpha_f;$$

where, $R_0$ is a rotation matrix corresponding to the initial image $I_i$ and the desired image $I_d$, $[\varphi_0] = \log(R_0^T) \in SO(3)$, $d_f$ is the depth from the origin of the desired image $I_d$ to the plane $\Pi$, and $\alpha_f$ is the unitary normal to the plane $\Pi$ in the desired image $I_d$; $t \in [0, t_f]$, 0 is the starting time corresponding to the initial image $I_i$, and $t_f$ is the ending time corresponding to the desired image $I_d$.

Figure 6A:
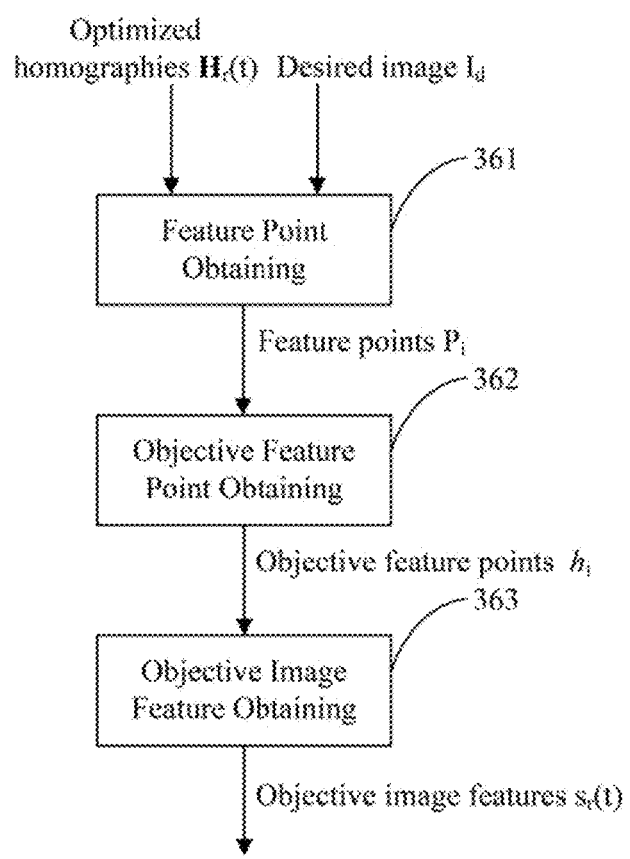
FIG. 6A is a schematic block diagram of an example of image feature obtaining in the example of trajectory planning of FIG. 3A.

The processing unit 110 may further obtain objective image features $s_r(t)$ corresponding to the trajectory $T_2$ based on the optimized homographies $H_r(\ )$ (block 360 of FIG. 3A). The trajectory$_2$ in terms of image features is obtained here. FIG. 6A is a schematic block diagram of an example of image feature obtaining in the example of trajectory planning of FIG. 3A. In the trajectory planning method, for obtaining objective image features (block 360 of FIG. 3A), in some embodiments, the processing unit 110 may obtain feature points $P_i$ of each of the initial image $I_i$, the desired image $I_d$, and intermediate image(s) $I_m$ corresponding to the intermediate pose(s) $S_m$ of the trajectory $T_2$ based on the optimized homographies $H_r(i)$ (block 361). The intermediate image(s) $I_m$ are pseudo images which are not captured by the camera C but correspond to the obtained feature points $P_i$ relative to the planned intermediate pose(s). In one embodiment, the feature points $P_i$ may be at least three non-collinear static points (unit in pixel) (see feature points $P_0$, $P_1$, $P_2$ and $P_3$ in FIG. 3C and feature points $P_0$, $P_1$ and $P_2$ in FIG. 6B) of each image. By substituting the optimized homographies $H_r(t)$ into the above-mentioned equation $[y_1(t), \ldots, y_n(t)] \propto H(t)[y_1(t_f), \ldots, y_n(t_f)]$ where $y_i(t_f)$ is the i-th image point of the desired image $I_d$ which is captured at the ending time $t_f$, the feature points $P_i$ (see FIG. 3C and FIG. 6B) among points $y_i(t)$ of the initial image $I_i$, the intermediate image(s) $I_{m,i}$, and the desired image $I_d$ can be obtained (a point $y_i(t)$ will belong to the initial image $I_i$ when t=0, belong to the desired image $I_d$ when t=$t_f$, and belong to the intermediate images $I_m$ when 0<t<$t_f$).

Figure 6B:
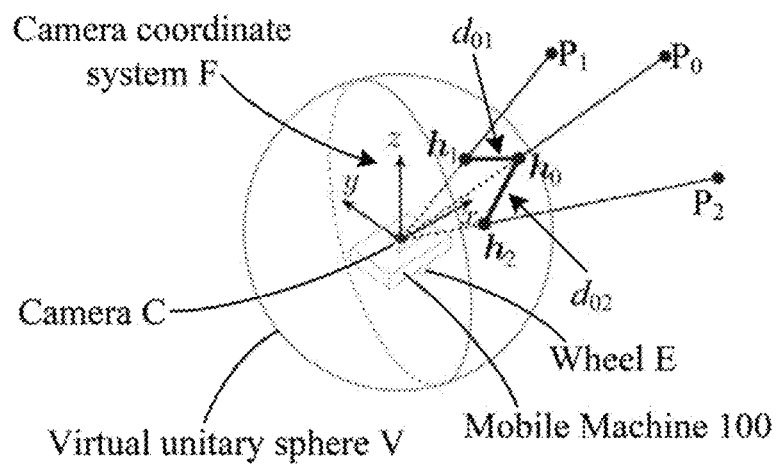
FIG. 6B is a schematic diagram of obtaining objective feature points in the example of image feature obtaining of FIG. 6A.

The processing unit 110 may further obtain objective feature points $h_i$ of each of the initial image $I_i$, the desired image $I_d$, and the intermediate image(s) $I_m$ by projecting the obtained feature points $P_i$ of each of the initial image $I_i$, the desired image $I_d$, and the intermediate image(s) $I_m$ onto a virtual unitary sphere V (see FIG. 6B) (block 362). FIG. 6B is a schematic diagram of obtaining the objective feature points $h_i$ in the example of image feature obtaining of FIG. 6A. The virtual unitary sphere V is a virtual sphere centered at the origin of an image captured by the camera C, which is used in combination with a perspective projection by a unified spherical model that is a geometric formulation which models central imaging systems, so that the image measurements from any (kind of) camera which obeys the unified spherical model can all be projected onto the generalized unitary sphere. The x axis and the y axis of the camera coordinate system F of the mobile machine 100 define a motion plane, where the x axis is aligned with the forward direction of the mobile machine 100, and the y axis is aligned with the axis of the wheels E of the mobile machine 100. The feature points $P_i$ (i.e., $P_0$, $P_1$, and $P_2$) in the camera coordinate system F are projected onto the virtual unitary sphere V as the objective feature points $h_i$ (i.e., $h_0$, $h_1$, and $h_2$).

The processing unit 110 may further obtain the objective image features $s_r(t)$ of each of the initial image $I_i$, the intermediate image(s) $I_m$, and the desired image $I_d$ using the plurality of obtained objective feature points $h_i$ of each of the initial image $I_i$, the intermediate image(s) $I_m$, and the desired image $I_d$ (block 363 of FIG. 6A). In some embodiments, the invariant visual features of image that are independent of the rotation of the camera C are used as the objective image features $s_r(t)$. Hence, the objective image features $s_r(t)$ may include centroid, moments, distances, areas, and other invariant visual features of image. In the case that the objective image features $s_r(t)$ include distances, the inverse of the distances $d_{ab}$ (e.g., $d_{01}$ and $d_{02}$ in FIG. 6B) between points $h_a$ and $h_b$ (e.g., $h_0$ and $h_1$, $h_0$ and $h_2$ in FIG. 6B) may be used as the image features $s_r(t)$ because it has the best linearizing properties between the task space and image space.

The image-based trajectory planning method plans a trajectory for a mobile machine with constraints in terms of image features in image plane coordinate. Then, during the navigation of the mobile machine, the poses of the mobile machine can be regulated according to the image features without requirements of the poses of the mobile machine relative to either inertial frame or visual target for feedback control, so that the mobile machine can eventually reach a desired pose in the trajectory without the need for pose measurements or estimations.

Figure 7:
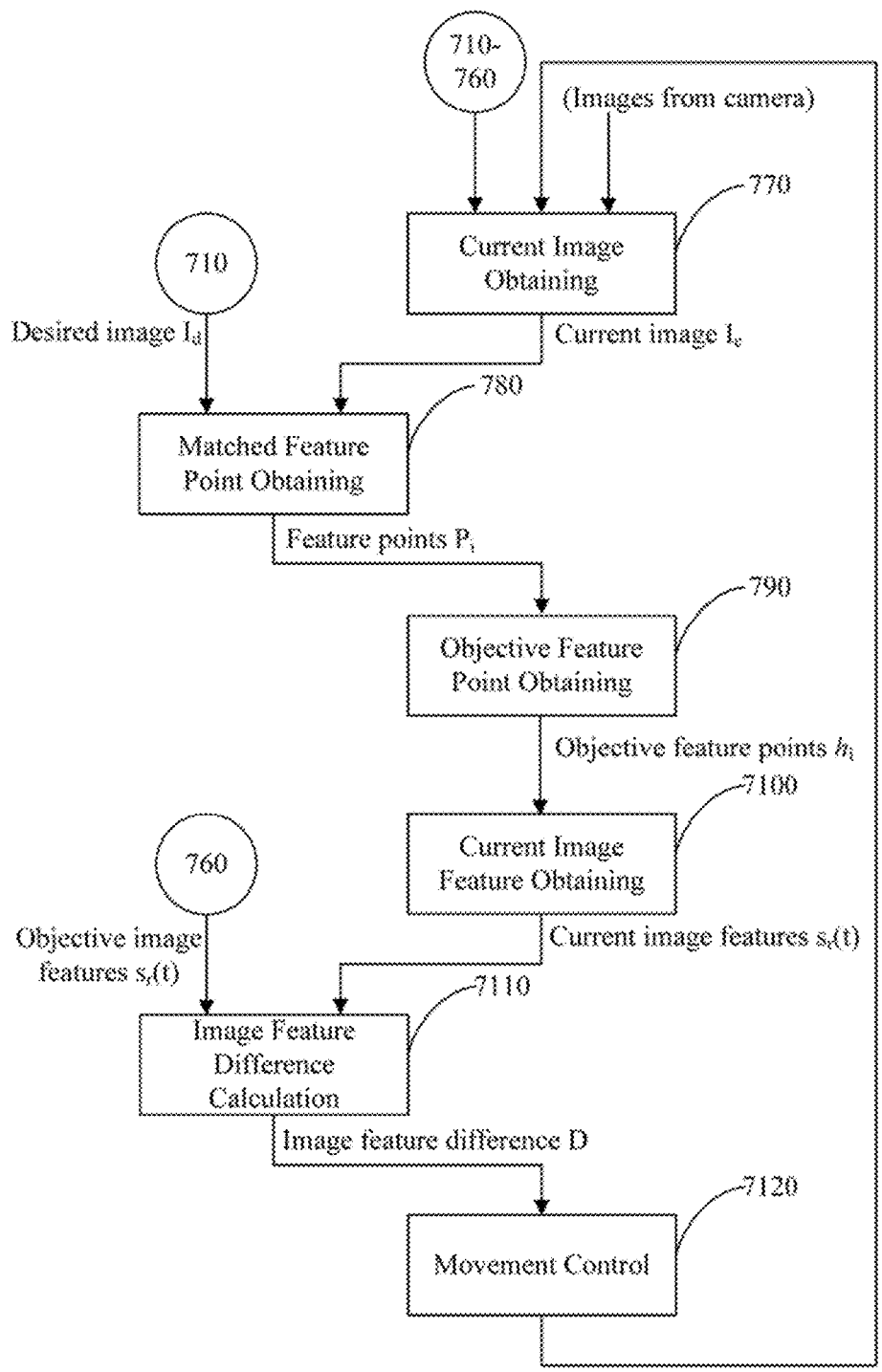
FIG. 7 is a schematic block diagram of an example of movement control for the mobile machine of FIG. 2.

FIG. 7 is a schematic block diagram of an example of movement control for the mobile machine 100 of FIG. 2. In some embodiments, a movement control method for the mobile machine 100 is implemented in the mobile machine 100 to (plan a trajectory and) move the mobile machine 100 according to the planned trajectory by, for example, storing (sets of) instructions $I_c$ corresponding to the movement control method in the storage unit 120 and executing the stored instructions $I_c$ through the processing unit 110. Blocks 710-760 which plan a trajectory (e.g., the trajectory $T_2$) for the mobile machine 100 and provide the objective image features $s_r(t)$ corresponding to the trajectory are omitted in FIG. 7 because they are the same as blocks 310-360 of FIG. 3A, respectively. In blocks 770-7120, the mobile machine 100 is controlled to move according to the obtained objective image features $s_r(t)$ corresponding to the planned trajectory.

According to the movement control method, the processing unit 110 may obtain a current image $I_c$ of the referenced target T captured at a current pose $S_c$ of the mobile machine 100 through the camera C of the mobile machine 100 (block 770). The current image $I_c$ has to include the referenced target T, so that feature points $P_i$ in the current image $I_c$ that correspond to the referenced target T can be obtained. The current pose $S_c$ is the pose of the mobile machine 100 at the time when the current image $I_c$ is captured, which may be just the initial pose $S_i$ if the mobile machine 100 has not moved yet after the initial image $I_i$ is captured (i.e., at the starting point of the trajectory $T_2$).

The processing unit 110 may further obtain the feature points $P_i$ of the current image $I_c$ that are matched with the feature points $P_i$ of the desired image $I_d$ (block 780). The matched feature points $P_i$ in the current image $I_c$ are found so as to obtain current image features $s_r(t)$ of the current image $I_c$ for comparing with the objective image features $s_r(t)$ of the intermediate image(s) $I_m$ and the desired image $I_d$.

The processing unit 110 may further obtain objective feature points $h_i$ by projecting the obtained feature points $P_i$ onto the virtual unitary sphere V (block 790). As mentioned above, the feature points $P_i$ are projected onto the virtual unitary sphere V as the objective feature points $h_i$ (see FIG. 6B).

The processing unit 110 may further obtain the current image features $s_r(t)$ of the current image $I_c$ using the obtained objective feature points $h_i$ (block 7100). As mentioned above, in some embodiments, the invariant visual features of image are used as the objective image features $s_r(t)$, and the objective image features $s_r(t)$ may include, for example, centroid, moments, distances, areas, and other invariant visual features of image. In the case that the obtained objective image features $s_r(t)$ include distances, the inverse of the distances $d_{ab}$ (e.g., $d_{o1}$ and $d_{o2}$ in FIG. 6B) between points $h_a$ and $h_b$ (e.g., $h_0$ and $h_1$, $h_0$ and $h_2$ in FIG. 6B) may be used as the objective image features $s_r(t)$.

The processing unit 110 may further calculate a difference D between the current image features $s_r(t)$ of the current image $I_c$ and the objective image features $s_r(t)$ corresponding to the current pose $S_c$ (block 7110). The current image features $s_r(t)$ of the current image $I_c$ are actual image features while the objective image features $s_r(t)$ corresponding to the current pose $S_c$ are expected image features, hence the current image features $s_r(t)$ of the current image $I_c$ may be compared with the objective image features $s_r(t)$ of the time of the current pose $S_c$, that is, the current image features $s_r(t)$ and the objective image features $s_r(t)$ of the same time t are compared, so as to obtain the difference D by, for example, in the case that the objective image features $s_r(t)$ and the current image features $s_r(t)$ include distances, the above-mentioned inverse of distances $d_{ab}$ (e.g., $d_{o1}$ and $d_{o2}$ in FIG. 6B) in the current image features $s_r(t)$ may be subtracted from that in objective image features $s_r(t)$ to obtain the differences D between the distances $d_{ab}$ of the objective image features $s_r(t)$ and the current image features $s_r(t)$.

The processing unit 110 may further control the mobile machine 100 to move according to the calculated difference D (block 7120). In the case that the objective image features $s_r(t)$ and the current image features $s_r(t)$ include distances, since the current image features $s_r(t)$ are actual image features while the objective image features $s_r(t)$ are expected image features, the mobile machine 100 may be controlled to move according to the above-mentioned differences D between the distances $d_{ab}$ in the objective image features $s_r(t)$ and that in the current image features $s_r(t)$, so as to offset the differences therebetween so that the mobile machine 100 can be moved according to the planned trajectory (e.g., the trajectory $T_2$).

The movement control method uses a trajectory for a mobile machine with constraints which is planned in terms of image features in image plane coordinate. The poses of the mobile machine will be regulated according to the image features during the movement of the mobile machine, and the mobile machine will be moved in a smoother way because the trajectory has planned with the optimization against the constraints for the mobile machine. In addition, in the movement control method, natural backward movements are also allowed.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned trajectory planning method and mobile machine may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A method for controlling a mobile machine having a camera to move according to a trajectory, wherein the trajectory comprises a plurality of poses, and the method comprises:
    obtaining, through the camera of the mobile machine, a desired image of a referenced target captured at a desired pose of the trajectory and an initial image of the referenced target captured at an initial pose of the trajectory, wherein the initial pose is the first of the plurality of poses, and the desired pose is the last of the plurality of poses;
    calculating a homography of the desired image and the initial image;
    decomposing the homography into an initial translation component and an initial rotation matrix;
    obtaining one or more optimized translation components corresponding to one or more constraints for the mobile machine based on the initial translation component;
    obtaining one or more optimized homographies based on the one or more optimized translation components and the initial rotation matrix;
    obtaining a plurality of objective image features corresponding to the trajectory based on the one or more optimized homographies; and
    controlling the mobile machine to move according to the objective image features corresponding to the trajectory.

2. The method of claim 1, wherein the controlling the mobile machine to move according to the objective image features corresponding to the trajectory comprises:
    obtaining, through the camera of the mobile machine, a current image of the referenced target captured at a current pose of the mobile machine;
    obtaining a plurality of feature points of the current image matched with a plurality of feature points of the desired image;
    obtaining a plurality of objective feature points by projecting the plurality of obtained feature points onto a virtual unitary sphere;
    obtaining a plurality of current image features of the current image using the plurality of obtained objective feature points;
    calculating a difference between the current image features of the current image and the objective image features corresponding to the current pose; and
    controlling the mobile machine to move according to the calculated difference.

3. The method of claim 1, wherein the decomposing the homography into the initial translation component and the initial rotation matrix comprises:
    decomposing the homography H(t) into a rotation matrix R(t) and a translation component b(t) through an equation of:

$$H(t) = R(t) + \frac{b(t)}{d_f}\alpha_f;$$

where, R(t) is a rotation matrix, b(t) is a translation component, $d_f$ is the depth from the origin of the desired image to a plane, and $\alpha_f$ is the unitary normal to the plane in the desired image; the initial translation component is b(0), and the initial rotation matrix is R(0).

4. The method of claim 1, wherein the obtaining the one or more optimized translation components corresponding to the one or more constraints for the mobile machine based on the initial translation component comprises:
    planning one or more intermediate poses of the trajectory meeting the one or more constraints for the mobile machine based on the initial translation component, wherein the one or more intermediate poses are between the initial pose and the desired pose in the trajectory; and
    obtaining the one or more optimized translation components based on the initial pose, the one or more planned intermediate poses, and the desired pose of the trajectory.

5. The method of claim 4, wherein each constraint for the mobile machine is represented through one objective function of a translation component, and the obtaining the one or more optimized translation components based on the initial pose, the one or more planned intermediate poses, and the desired pose of the trajectory comprises:
    minimizing the sum of the objective function of the one or more constraints for the mobile machine; and
    taking the translation component corresponding to each objective function as an optimized translation component.

6. The method of claim 1, wherein the obtaining the one or more optimized homographies based on the one or more optimized translation components and the initial rotation matrix comprises:
    calculating the one or more optimized homographies $H_r(t)$ through an equation of:

$$H_r(t) = R_0 e^{[\varphi_0]t/t_f} + \frac{b_r(t)}{d_f}\alpha_f;$$

where, $R_0$ is a rotation matrix corresponding to the initial image and the desired image, $[\varphi_0]=\log(R_0^T) \in SO(3)$, $b_r(t)$ is an optimized translation component, $d_f$ is the depth from the origin of the desired image to a plane, and $\alpha_f$ is the unitary normal to the plane in the desired image; $t \in [0, t_f]$, 0 is the starting time corresponding to the initial image, and $t_f$ is the ending time corresponding to the desired image.

7. The method of claim 1, wherein the obtaining the plurality of objective image features corresponding to the trajectory based on the one or more optimized homographies comprises:

obtaining a plurality of feature points of each of the initial image, the desired image, and one or more intermediate images corresponding to one or more intermediate poses of the trajectory based on the one or more optimized homographies, wherein the one or more intermediate poses are between the initial pose and the desired pose in the trajectory;

obtaining a plurality of objective feature points of each of the initial image, the desired image, and the one or more intermediate images by projecting the plurality of obtained feature points of each of the initial image, the desired image, and the one or more intermediate images onto a virtual unitary sphere; and obtaining the plurality of objective image features of each of the initial image, the one or more intermediate images, and the desired image using the plurality of obtained objective feature points of each of the initial image, the one or more intermediate images, and the desired image.

8. A mobile machine, comprising:

a camera;

one or more processors; and one or more memories storing one or more programs configured to be executed by the one or more processors, wherein the one or more programs comprise instructions for:

obtaining, through the camera of the mobile machine, a desired image of a referenced target captured at a desired pose of a trajectory and an initial image of the referenced target captured at an initial pose of the trajectory, wherein the trajectory comprises a plurality of poses, and the initial pose is the first of the plurality of poses, and the desired pose is the last of the plurality of poses;

calculating a homography of the desired image and the initial image;

decomposing the homography into an initial translation component and an initial rotation matrix;

obtaining one or more optimized translation components corresponding to one or more constraints for the mobile machine based on the initial translation component;

obtaining one or more optimized homographies based on the one or more optimized translation components and the initial rotation matrix;

obtaining a plurality of objective image features corresponding to the trajectory based on the one or more optimized homographies; and controlling the mobile machine to move according to the objective image features corresponding to the trajectory.

9. The mobile machine of claim 8, wherein the controlling the mobile machine to move according to the objective image features corresponding to the trajectory comprises:

obtaining, through the camera of the mobile machine, a current image of the referenced target captured at a current pose of the mobile machine;

obtaining a plurality of feature points of the current image matched with a plurality of feature points of the desired image;

obtaining a plurality of objective feature points by projecting the plurality of obtained feature points onto a virtual unitary sphere;

obtaining a plurality of current image features of the current image using the plurality of obtained objective feature points;

calculating a difference between the current image features of the current image and the objective image features corresponding to the current pose; and controlling the mobile machine to move according to the calculated difference.

10. The mobile machine of claim 8, wherein the decomposing the homography into the initial translation component and the initial rotation matrix comprises:

decomposing the homography $H(t)$ into a rotation matrix $R(t)$ and a translation component $b(t)$ through an equation of:

$$H(t) = R(t) + \frac{b(t)}{d_f}\alpha_f;$$

where, $R(t)$ is a rotation matrix, $b(t)$ is a translation component, $d_f$ is the depth from the origin of the desired image to a plane, and $\alpha_f$ is the unitary normal to the plane in the desired image; the initial translation component is $b(0)$, and the initial rotation matrix is $R(0)$.

11. The mobile machine of claim 8, wherein the obtaining the one or more optimized translation components corresponding to the one or more constraints for the mobile machine based on the initial translation component comprises:

planning one or more intermediate poses of the trajectory meeting the one or more constraints for the mobile machine based on the initial translation component, wherein the one or more intermediate poses are between the initial pose and the desired pose in the trajectory; and obtaining the one or more optimized translation components based on the initial pose, the one or more planned intermediate poses, and the desired pose of the trajectory.

12. The mobile machine of claim 8, wherein the obtaining the one or more optimized homographies based on the one or more optimized translation components and the initial rotation matrix comprises:

calculating the one or more optimized homographies $H_r(t)$ through an equation of:

$$H_r(t) = R_0 e^{[\varphi_0]t/t_f} + \frac{b_r(t)}{d_f}\alpha_f;$$

where, $R_0$ is a rotation matrix corresponding to the initial image and the desired image, $[\varphi_0]=\log(R_0^T) \in SO(3)$, $b_r(t)$ is an optimized translation component, $d_f$ is the depth from the origin of the desired image to a plane, and $\alpha_f$ is the unitary normal to the plane in the desired image; $t \in [0, t_f]$, 0 is the starting time corresponding to the initial image, and $t_f$ is the ending time corresponding to the desired image.

13. The mobile machine of claim 8, wherein the obtaining the plurality of objective image features corresponding to the trajectory based on the one or more optimized homographies comprises:
obtaining a plurality of feature points of each of the initial image, the desired image, and one or more intermediate images corresponding to one or more intermediate poses of the trajectory based on the one or more optimized homographies, wherein the one or more intermediate poses are between the initial pose and the desired pose in the trajectory;
obtaining a plurality of objective feature points of each of the initial image, the desired image, and the one or more intermediate images by projecting the plurality of obtained feature points of each of the initial image, the desired image, and the one or more intermediate images onto a virtual unitary sphere; and
obtaining the plurality of objective image features of each of the initial image, the one or more intermediate images, and the desired image using the plurality of obtained objective feature points of each of the initial image, the one or more intermediate images, and the desired image.

14. The mobile machine of claim 11, wherein each constraint for the mobile machine is represented through one objective function of a translation component, and the obtaining the one or more optimized translation components based on the initial pose, the one or more planned intermediate poses, and the desired pose of the trajectory comprises:
minimizing the sum of the objective function of the one or more constraints for the mobile machine; and
taking the translation component corresponding to each objective function as an optimized translation component.

15. A non-transitory computer readable storage medium storing one or more programs configured to be executed by the one or more processors, wherein the one or more programs comprise instructions for:
obtaining, through a camera of a mobile machine, a desired image of a referenced target captured at a desired pose of a trajectory and an initial image of the referenced target captured at an initial pose of the trajectory, wherein the trajectory comprises a plurality of poses, and the initial pose is the first of the plurality of poses, and the desired pose is the last of the plurality of poses;
calculating a homography of the desired image and the initial image;
decomposing the homography into an initial translation component and an initial rotation matrix;
obtaining one or more optimized translation components corresponding to one or more constraints for the mobile machine based on the initial translation component;
obtaining one or more optimized homographies based on the one or more optimized translation components and the initial rotation matrix;
obtaining a plurality of objective image features corresponding to the trajectory based on the one or more optimized homographies; and
controlling the mobile machine to move according to the objective image features corresponding to the trajectory.

16. The non-transitory computer readable storage medium of claim 15, wherein the controlling the mobile machine to move according to the objective image features corresponding to the trajectory comprises:
obtaining, through the camera of the mobile machine, a current image of the referenced target captured at a current pose of the mobile machine;
obtaining a plurality of feature points of the current image matched with a plurality of feature points of the desired image;
obtaining a plurality of objective feature points by projecting the plurality of obtained feature points onto a virtual unitary sphere;
obtaining a plurality of current image features of the current image using the plurality of obtained objective feature points;
calculating a difference between the current image features of the current image and the objective image features corresponding to the current pose; and
controlling the mobile machine to move according to the calculated difference.

17. The non-transitory computer readable storage medium of claim 15, wherein the obtaining the one or more optimized translation components corresponding to the one or more constraints for the mobile machine based on the initial translation component comprises:
planning one or more intermediate poses of the trajectory meeting the one or more constraints for the mobile machine based on the initial translation component, wherein the one or more intermediate poses are between the initial pose and the desired pose in the trajectory; and
obtaining the one or more optimized translation components based on the initial pose, the one or more planned intermediate poses, and the desired pose of the trajectory.

18. The non-transitory computer readable storage medium of claim 17, wherein each constraint for the mobile machine is represented through one objective function of a translation component, and the obtaining the one or more optimized translation components based on the initial pose, the one or more planned intermediate poses, and the desired pose of the trajectory comprises:
minimizing the sum of the objective function of the one or more constraints for the mobile machine; and
taking the translation component corresponding to each objective function as an optimized translation component.

19. The non-transitory computer readable storage medium of claim 15, wherein the obtaining the plurality of objective image features corresponding to the trajectory based on the one or more optimized homographies comprises:
obtaining a plurality of feature points of each of the initial image, the desired image, and one or more intermediate images corresponding to one or more intermediate poses of the trajectory based on the one or more optimized homographies, wherein the one or more intermediate poses are between the initial pose and the desired pose in the trajectory;
obtaining a plurality of objective feature points of each of the initial image, the desired image, and the one or more intermediate images by projecting the plurality of obtained feature points of each of the initial image, the desired image, and the one or more intermediate images onto a virtual unitary sphere; and obtaining the plurality of objective image features of each of the initial image, the one or more intermediate images, and the desired image using the plurality of obtained objective feature points of each of the initial image, the one or more intermediate images, and the desired image.

\* \* \* \* \*